United States Patent
Sato et al.

(10) Patent No.: US 9,902,407 B2
(45) Date of Patent: Feb. 27, 2018

(54) PARALLEL CARDAN DRIVING SYSTEM STEERING BOGIE

(71) Applicant: KAWASAKI JUKOGYO KABUSHIKI KAISHA, Kobe-shi, Hyogo (JP)

(72) Inventors: Yoshi Sato, Kobe (JP); Shunichi Nakao, Kobe (JP)

(73) Assignee: KAWASAKI JUKOGYO KABUSHIKI KAISHA, Kobe-shi (JP)

(*) Notice: Subject to any disclaimer, the term of this patent is extended or adjusted under 35 U.S.C. 154(b) by 213 days.

(21) Appl. No.: 14/773,576

(22) PCT Filed: Mar. 5, 2014

(86) PCT No.: PCT/JP2014/001212
§ 371 (c)(1),
(2) Date: Sep. 8, 2015

(87) PCT Pub. No.: WO2014/136449
PCT Pub. Date: Sep. 12, 2014

(65) Prior Publication Data
US 2016/0023670 A1    Jan. 28, 2016

(30) Foreign Application Priority Data
Mar. 6, 2013 (JP) ................. 2013-044297

(51) Int. Cl.
*B61F 5/38* (2006.01)
*B61F 3/04* (2006.01)
(Continued)

(52) U.S. Cl.
CPC .................. *B61F 5/38* (2013.01); *B61C 9/50* (2013.01); *B61F 3/04* (2013.01); *B61F 5/46* (2013.01); *F16D 3/18* (2013.01); *F16D 3/223* (2013.01)

(58) Field of Classification Search
CPC ...... B61F 5/38; B61F 5/46; B61F 3/04; F16D 3/223; F16D 3/18; F16D 3/227; B61C 9/50; B61C 9/38
(Continued)

(56) References Cited

U.S. PATENT DOCUMENTS 1,810,834 A * 6/1931 Klein ........................ B61C 9/50
                                                            105/113
2,312,924 A * 3/1943 Morey ...................... B61C 9/30
                                                            105/118
(Continued)

FOREIGN PATENT DOCUMENTS

| CN | 101968084 A | 2/2011 |
| JP | H06-135330 A | 5/1994 |

(Continued)

OTHER PUBLICATIONS

Sep. 20, 2016 Office Action issued in Chinese. Patent Application No. 201480011952.1.
(Continued)

*Primary Examiner* — Mark T Le
(74) *Attorney, Agent, or Firm* — Oliff PLC

(57) ABSTRACT

A steering mechanism configured to rotate first and second axles relative to bogie-frame to perform steering; electric motors supported by bogie-frame, arranged at the front and rear sides in the car longitudinal direction, respectively, including output shafts, respectively, and output shafts being parallel to first and second axles at the time of non-steering; reducers connected to axles, respectively; and first constant velocity ball joint by which the first output shaft is coupled to the first reducer and which follows rotations of the first axle at the time of steering to allow relative displacement between the first output shaft and the first reducer, and a second constant velocity ball joint by which the second output shaft is coupled to the second reducer and which
(Continued)

follows rotations of the second axle at the time of the steering to allow relative displacement between the second output shaft and the second reducer.

3 Claims, 5 Drawing Sheets

(51) Int. Cl.
  *B61F 5/46*  (2006.01)
  *F16D 3/18*  (2006.01)
  *B61C 9/50*  (2006.01)
  *F16D 3/223*  (2011.01)

(58) Field of Classification Search
  USPC .................................................. 105/138, 140
  See application file for complete search history.

(56) References Cited

U.S. PATENT DOCUMENTS

| | | | |
|---|---|---|---|
| 3,152,558 A * | 10/1964 | Mueller | B61C 9/00 |
| | | | 105/133 |
| 4,228,739 A | 10/1980 | Fitzgibbon | |
| 4,648,236 A | 3/1987 | Knecht | |
| 4,660,476 A * | 4/1987 | Franz | B61F 5/325 |
| | | | 105/168 |
| 6,616,538 B2 * | 9/2003 | Perrow | F16D 3/227 |
| | | | 464/146 |

FOREIGN PATENT DOCUMENTS

| | | |
|---|---|---|
| JP | H07-44715 U | 11/1995 |
| JP | H09-109885 A | 4/1997 |
| JP | H10-203364 A | 8/1998 |
| JP | H10-297486 A | 11/1998 |
| JP | 2006-083962 A | 3/2006 |
| JP | 2008-162455 A | 7/2008 |
| JP | 2010-058650 A | 3/2010 |
| JP | 2010-167835 A | 8/2010 |
| WO | 2009/038068 A1 | 3/2009 |
| WO | 2012/137257 A1 | 10/2012 |

OTHER PUBLICATIONS

Nov. 15, 2016 Extended European Search Report issued in European Patent Application No. 14761074.5.

Jun. 10, 2014 International Search Report issued in International Patent Application No. PCT/JP2014/001212.

Jun. 10, 2014 Written Opinion issued in Japanese Patent Application No. PCT/JP2014/001212.

* cited by examiner

PARALLEL CARDAN DRIVING SYSTEM STEERING BOGIE

TECHNICAL FIELD

The present invention relates to a parallel cardan driving system steering bogie for a railcar.

BACKGROUND ART

Regarding a bogie of a railcar, conventionally proposed is a steering bogie configured such that an angle of an axle in a yawing direction is changed along a curved track (see PTLs 1 to 4, for example). According to this, lateral force (turning resistance force) acting on wheels when the bogie passes through a curved line is reduced. Therefore, running stability of the bogie when the bogie passes through a sharp curved line improves. In addition, fricative sounds generated between the wheel and a railway track are reduced, and wear of the wheels and the like can also be reduced.

However, if a parallel cardan driving system driving bogie is provided with a steering mechanism, the axle steered when the bogie turns is largely displaced in the yawing direction, and this exceeds an allowable deviation of a WN gear coupling connecting a reducer and an electric motor. The WN gear coupling allows the deviation by a backlash formed between an internal tooth of an outer tube and an external tooth of an inner tube. However, since proper meshing between the internal tooth and the external tooth needs to be maintained, increasing the backlash has a limit. Therefore, a parallel cardan driving system driving bogie having a steering function does not exist currently.

Here, PTL 5 proposes a steering bogie configured such that: one of axles is a driving shaft; the other axle is a driven shaft; and only the driven shaft has the steering function. According to this, only the driven shaft which does not require an electric motor, a joint, or a reducer is steered, it is unnecessary to consider the limit of the deviation of the joint by the steering.

CITATION LIST

Patent Literature

PTL 1: Japanese Laid-Open Patent Application Publication No. 6-135330
PTL 2: Japanese Laid-Open Patent Application Publication No. 10-203364
PTL 3: International Publication No. 2009/038068
PTL 4: Japanese Laid-Open Patent Application Publication No. 2010-167835
PTL 5: Japanese Laid-Open Patent Application Publication No. 2010-58650

SUMMARY OF INVENTION

Technical Problem

However, since only one of front and rear axles is steered, an effect of reducing the lateral force acting on the wheels changes by a running direction. Further, the driving bogie including a pair of axles is provided with only one driving shaft. Therefore, in a train in which a plurality of cars are coupled to one another, the number of cars (driving cars) each of which requires the driving bogie increases, and the number of cars (non-driving cars) each of which does not include devices (a voltage transformer, a converter, a power cable, and the like) for driving decreases. This causes an increase in cost and the like.

An object of the present invention is to realize a parallel cardan driving system driving bogie having a steering function while suppressing a change in the steering function by a running direction and an increase in cost of a railcar.

Solution to Problem

A parallel cardan driving system steering bogie for a railcar according to the present invention includes: a bogie frame supporting a carbody of a railcar; first and second axles arranged at front and rear sides in a car longitudinal direction, respectively, and extending along a car width direction; a steering mechanism configured to rotate both the first and second axles relative to the bogie frame to perform steering; first and second electric motors supported by the bogie frame, arranged at the front and rear sides in the car longitudinal direction, respectively, and including first and second output shafts, respectively, the first and second output shafts being parallel to the first and second axles at the time of non-steering; first and second reducers connected to the first and second axles, respectively; and a first constant velocity ball joint by which the first output shaft is coupled to the first reducer and which follows rotations of the first axle at the time of steering to allow relative displacement between the first output shaft and the first reducer, and a second constant velocity ball joint by which the second output shaft is coupled to the second reducer and which follows rotations of the second axle at the time of the steering to allow relative displacement between the second output shaft and the second reducer.

According to the above configuration, the constant velocity ball joint is used as a joint between the output shaft and the reducer. Therefore, the backlash is unnecessary unlike the conventional WN gear coupling, and large deviation is allowable by spherical guide of the ball. On this account, even if the relative displacement of the axle in the yawing direction relative to the electric motor supported by the bogie frame occurs when the bogie passes through the curved line and the axle is steered, the constant velocity ball joint can follow the displacement. Since the constant velocity ball joint can follow the steering of the axle, both the first and second axles can be configured as the driving shafts which can be steered. As a result, it is possible to provide the parallel cardan driving system steering bogie capable of suppressing the change in the steering function by the running direction and the increase in the cost of the railcar.

Advantageous Effects of Invention

As is clear from the above explanation, the present invention can provide the parallel cardan driving system steering bogie capable of suppressing the change in the steering function by the running direction and the increase in the cost of the railcar.

DESCRIPTION OF EMBODIMENTS

Hereinafter, an embodiment will be explained in reference to the drawings.

Figure 1:
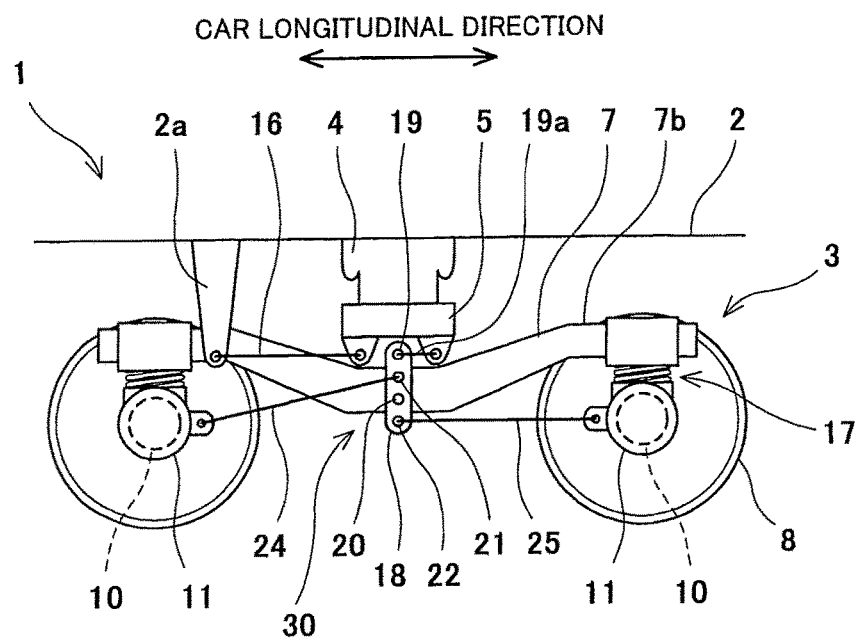
FIG. 1 is a side view showing a parallel cardan driving system steering bogie according to an embodiment.
Figure 2:
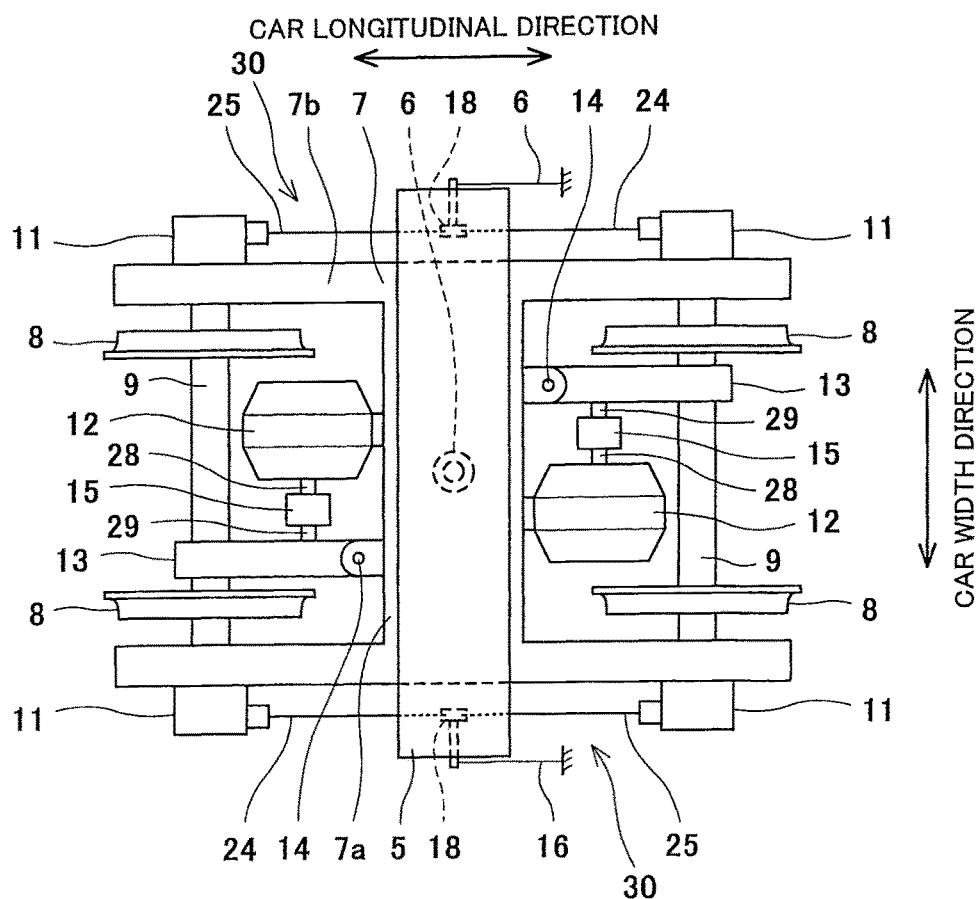
FIG. 2 is a plan view showing the parallel cardan driving system steering bogie of FIG. 1.

FIG. 1 is a side view showing a parallel cardan driving system steering bogie 3 according to the embodiment. FIG. 2 is a plan view showing the parallel cardan driving system steering bogie 3 of FIG. 1. In the following explanation, a direction in which a railcar 1 travels, that is, a length direction in which a carbody 2 extends is defined as a car longitudinal direction. A lateral direction perpendicular to the car longitudinal direction is defined as a car width direction (in the present embodiment, the car longitudinal direction is also called a "forward/rearward direction", and the car width direction is also called a "leftward/rightward direction"). In the drawings, the same reference signs are used for the same components.

As shown in FIGS. 1 and 2, the bogie 3 of the present embodiment is a bogie which supports the carbody 2 of the railcar 1 from below. In a plan view, the bogie 3 is formed in a point symmetry when viewed from a center of the bogie. The bogie 3 includes a bolster 5 which supports the carbody 2 via air springs 4 and extends in the car width direction. The bolster 5 is connected to bolster anchors 16 by brackets 2a of the carbody 2. The bolster 5 is connected to a bogie frame 7 through a turning guide mechanism 6 (for example, a center pin and a center plate) arranged at the center of the bogie in a plan view. To be specific, the bogie frame 7 slidably supports the bolster 5 from below so as to be able to horizontally turn relative to the bolster 5.

The bogie frame 7 includes a cross beam 7a and a pair of side sills 7b. The cross beam 7a is located under the bolster 5 and extends in the car width direction. The side sills 7b are connected to both respective car width direction end portions of the cross beam 7a and extend in the car longitudinal direction. The bogie frame 7 has an H shape in a plan view. First and second axles 9 extending in the car width direction are arranged in front of and behind the cross beam 7a, respectively. Wheels 8 are provided at respective left and right sides of each axle 9. Each of bearings 10 is provided at a car width direction end portion of the axle 9 so as to be located outside the wheel 8 in the car width direction. The bearings 10 rotatably support the axles 9. The bearings 10 are accommodated in respective axle boxes 11. Each of the axle boxes 11 is elastically coupled to and suspended from the side sill 7b by an axle box suspension 17 (suspension) including a coil spring (axle spring). Various types such as a publicly known axle beam type may be used as the axle box suspension 17.

First and second electric motors 12 are arranged in front of and behind the cross beam 7a, respectively. Each of the first and second electric motors 12 is not attached to the axle 9 but is fixed to the bogie frame 7 so as to be spaced apart from the axle 9. First and second reducers 13 are connected to the first and second axles 9, respectively. In a side view, the first and second reducers 13 are rotatable around the first and second axles 9, respectively. An end portion of the reducer 13 is elastically coupled to the cross beam 7a by a support mechanism 14, the end portion being located at the cross beam 7a side. To be specific, the first and second reducers 13 may be displaced relative to the bogie frame 7 in upward/downward, forward/rearward, and leftward/rightward directions.

An output shaft 28 of the first electric motor 12 is connected to an input shaft 29 of the first reducer 13 through a constant velocity ball joint 15, and an output shaft 28 of the second electric motor 12 is connected to an input shaft 29 of the second reducer 13 via a constant velocity ball joint 15. The output shaft 28 of the first electric motor 12 and the input shaft 29 of the first reducer 13 extend in parallel with the first axle 9 in the car width direction when a below-described steering mechanism 30 is in a non-steering state. The output shaft 28 of the second electric motor 12 and the input shaft 29 of the second reducer 13 extend in parallel with the second axle 9 in the car width direction when the steering mechanism 30 is in the non-steering state. The electric motor 12 and the reducer 13 are lined up in the car width direction so as to overlap each other in a side view. To be specific, the bogie 3 of the present embodiment is a so-called parallel cardan driving system driving bogie.

The bogie 3 is provided with the steering mechanism 30. The steering mechanism 30 rotates both the first and second axles 9 relative to the bogie frame 7 in the yawing direction to perform the steering. The steering mechanism 30 includes swinging levers 18. The swinging levers 18 are arranged at respective car width direction outer sides of the cross beam 7a so as to extend in a vertical direction. An upper portion of the swinging lever 18 is attached to the bolster 5 or the bolster anchor 16 through a link 19a so as to be rotatable around a fulcrum 19. A portion of the swinging lever 18 is attached to a side surface of the bogie frame 7 so as to be rotatable around a fulcrum 20, the portion being located under the fulcrum 19. A portion of the swinging lever 18 is attached to one end portion of a coupling rod 24 so as to be rotatable around a fulcrum 21, the portion being located between the fulcrums 19 and 20. The other end portion of the coupling rod 24 is rotatably coupled to the axle box 11 located at one car longitudinal direction side.

A portion of the swinging lever 18 is attached to one end portion of a coupling rod 25 so as to be rotatable around a fulcrum 22, the portion being located under the fulcrum 20. The other end portion of the coupling rod 25 is rotatably coupled to the axle box 11 located at the other car longitudinal direction side. Each of the fulcrums 19 to 22 is constituted by a connector (such as a pin) by which two members are rotatably connected to each other. With this, when the bogie 3 passes through the curved line, the swinging lever 18 swings around the fulcrum 19 in a vertical plane, and therefore, both the front and rear axles 9 can be steered. At the time of the steering, the constant velocity ball joint 15 deviates and flexibly follows the rotation of the axle 9. With this, the relative displacement between the output shaft 28 of the electric motor 12 and the input shaft 29 of the reducer 13 is allowed.

Figure 3:
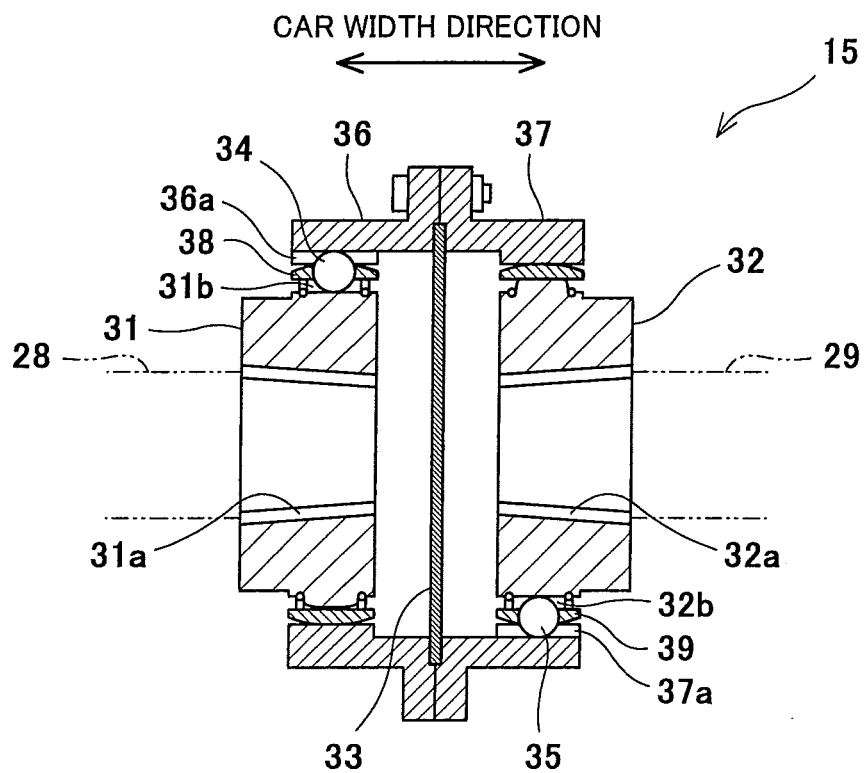
FIG. 3 is a cross-sectional view showing a constant velocity ball joint of the steering bogie of FIG. 2.
Figure 4:
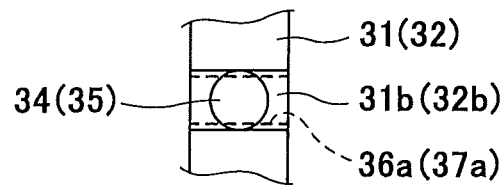
FIG. 4 is a major component plan view for explaining a groove portion of the constant velocity ball joint of FIG. 3.

FIG. 3 is a cross-sectional view showing the constant velocity ball joint 15 of the steering bogie 3 of FIG. 2. FIG. 4 is a major component plan view for explaining groove portions 31b and 36a (32b and 37a) of the constant velocity ball joint 15 of FIG. 3. As shown in FIGS. 3 and 4, the constant velocity ball joint 15 includes a first inner tube 31 and a second inner tube 32. The first inner tube 31 includes an insertion hole 31a to which the output shaft 28 of the electric motor 12 is splined. The second inner tube 32 includes an insertion hole 32a to which the input shaft 29 of the reducer 13 is splined. The first inner tube 31 and the second inner tube 32 are spaced apart from each other. A plurality of groove portions 31b extending in an axial direction of the output shaft 28 are formed on an outer peripheral surface of the inner tube 31 at equal intervals in the circumferential direction. A plurality of groove portions 32b extending in an axial direction of the input shaft 29 are formed on an outer peripheral surface of the inner tube 32 at equal intervals in the circumferential direction.

A first outer tube 36 is provided at a radially outer side of the first inner tube 31, and a second outer tube 37 is provided at a radially outer side of the second inner tube 32. The first outer tube 36 and the second outer tube 37 are coupled to each other via a partition plate 33. A plurality of groove portions 36a extending in the axial direction of the output shaft 28 are formed on an inner peripheral surface of the outer tube 36 at equal intervals in the circumferential direction. A plurality of groove portions 37a extending in the axial direction of the input shaft 29 are formed on an inner peripheral surface of the outer tube 37 at equal intervals in the circumferential direction. Each of balls 34 is slidably sandwiched between the groove portion 31b of the inner tube 31 and the groove portion 36a of the outer tube 36. Each of balls 35 is slidably sandwiched between the groove portion 32b of the inner tube 32 and the groove portion 37a of the outer tube 37. An annular ball retainer 38 locked with the inner tube 31 is arranged between the inner tube 31 and the outer tube 36, and an annular ball retainer 39 locked with the inner tube 32 is arranged between the inner tube 32 and the outer tube 37. A plurality of ball holes each of which slidably holds the ball 34 are formed on the ball retainer 38 at equal intervals in the circumferential direction. A plurality of ball holes each of which slidably holds the ball 35 are formed on the ball retainer 39 at equal intervals in the circumferential direction. The groove portions 31b of the inner tube 31 and the groove portions 36a of the outer tube 36 extend in a direction along the axial direction of the output shaft 28, and the groove portions 32b of the inner tube 32 and the groove portions 37a of the outer tube 37 extend in a direction along the axial direction of the input shaft 29.

Figure 5:
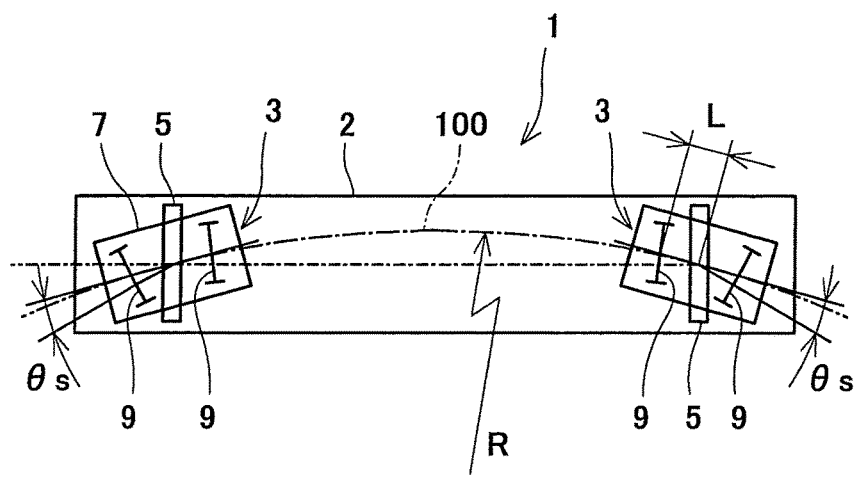
FIG. 5 is a schematic plan view showing a state where a railcar including the parallel cardan driving system steering bogies of FIG. 1 passes through a curved line.

FIG. 5 is a schematic plan view showing a state where the railcar 1 including the parallel cardan driving system steering bogie 3 of FIG. 1 passes through the curved line. In FIG. 5, a track line 100 is a curved line that indicates a center line extending between a pair of rails (not shown). When the railcar 1 passes through the curved line, the steering mechanism 30 (see FIGS. 1 and 2) operates by lateral force applied from the rails to the wheels 8 of the bogie 3. Thus, self-steering is performed such that each of the axles 9 faces in a direction substantially perpendicular to the track line 100. A steering angle $\theta_s$ is represented by Formula 1 below where a half of a distance between the axles of the bogie 3 is denoted by L, a curvature radius of the track line 100 is denoted by R, and a steering additional coefficient is denoted by $\lambda$.

$$\theta_s = \lambda \cdot \arcsin\left(\frac{L}{R}\right) \qquad \text{Formula 1}$$

Figure 6:
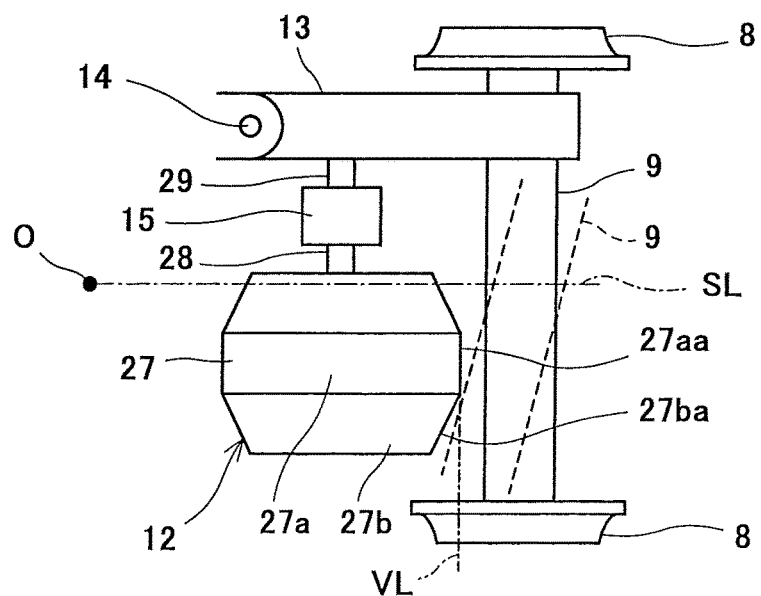
FIG. 6 is an enlarged view showing major components of the parallel cardan driving system steering bogie of FIG. 2.

FIG. 6 is an enlarged view showing major components of the parallel cardan driving system steering bogie 3 of FIG. 2. As shown in FIG. 6, the electric motor 12 is arranged on a virtual line SL extending in the car longitudinal direction through a steering center O of the axle 9. The electric motor 12 includes a casing 27 which accommodates a rotor and a stator. The casing 27 includes an intermediate portion 27a and an outside portion 27b. The intermediate portion 27a is located at a car width direction intermediate region. The outside portion 27b is located at a car width direction outside region relative to the intermediate portion 27a. To be specific, the outside portion 27b is provided further away from the virtual line SL than the intermediate portion 27a in the car width direction.

A surface 27ba of the outside portion 27b is provided further away from the axle 9 than a surface 27aa of the intermediate portion 27a, the surfaces 27ba and 27aa being close to the axle 9. Specifically, the surface 27ba of the outside portion 27b is inclined such that a distance from the surface 27ba to the axle 9 in the car longitudinal direction increases toward an outer side in the car width direction. In the present embodiment, the surface 27ba of the outside portion 27b has a tapered shape but may have a circular-arc shape. The casing 27 shown in FIG. 6 has a substantially symmetrical shape in the car width direction but does not have to be symmetrical.

As shown by broken lines in FIG. 6, when the axle 9 is steered by the steering mechanism 30 (see FIGS. 1 and 2), a car width direction outside portion of the axle 9 may move close to the electric motor 12. As described above, the casing 27 of the electric motor 12 has the above shape. Therefore, in a state where a gap is secured between the surface 27ba of the outside portion 27b of the casing 27 and the axle 9, the axle 9 can intersect with a virtual extended line VL in a plan view, the virtual extended line VL extending in the car width direction from the surface 27aa of the intermediate portion 27a.

Figure 7A:
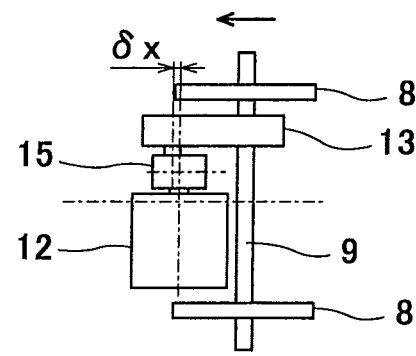
FIG. 7A is a schematic diagram for explaining a car longitudinal direction displacement between an electric motor and a reducer by a suspension.
Figure 7B:
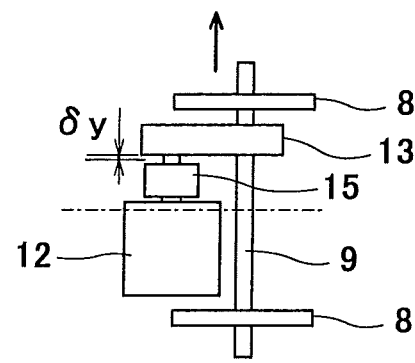
FIG. 7B is a schematic diagram for explaining a car width direction displacement between the electric motor and the reducer by the suspension.
Figure 7C:
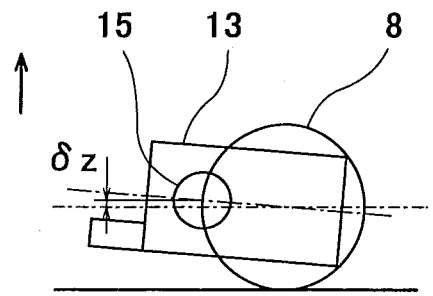
FIG. 7C is a schematic diagram for explaining a vertical direction displacement between the electric motor and the reducer by the suspension.

FIG. 7A is a schematic diagram for explaining a car longitudinal direction displacement between the electric motor 12 and the reducer 13 by the axle box suspension 17. FIG. 7B is a schematic diagram for explaining a car width direction displacement between the electric motor 12 and the reducer 13 by the axle box suspension 17. FIG. 7C is a schematic diagram for explaining a vertical direction displacement between the electric motor 12 and the reducer 13 by the axle box suspension 17. The axle box suspension 17 (see FIG. 1) of the bogie 3 has flexibility in the upward/downward, forward/rearward, and leftward/rightward directions. Therefore, each of the relative displacement generated by the axle box suspension 17 in the forward/rearward direction (FIG. 7A), the relative displacement generated by the axle box suspension 17 in the leftward/rightward direction (FIG. 7B), and the relative displacement generated by the axle box suspension 17 in the upward/downward direction (FIG. 7C) may occur between the electric motor 12 attached to the bogie frame 7 and the reducer 13 attached to the axle 9.

As shown in FIG. 7A, a forward/rearward direction allowable displacement amount between the electric motor 12 and the reducer 13 in the bogie 3 by the axle box suspension 17 is denoted by $\delta_x$. As shown in FIG. 7B, a car width direction allowable displacement amount between the electric motor 12 and the reducer 13 in the bogie 3 by the axle box suspension 17 is denoted by $\delta_y$. As shown in FIG. 7C, an upward/downward direction allowable displacement amount between the electric motor 12 and the reducer 13 in the bogie 3 by the axle box suspension 17 is denoted by $\delta_z$. Each of the allowable displacement amounts $\delta_x$, $\delta_y$, and $\delta_z$ denotes an upper limit of a relative displacement amount between the electric motor 12 and the reducer 13 based on a neutral state where: an axis of the output shaft 28 (see FIG. 2) of the electric motor 12 and an axis of the input shaft 29 (see FIG. 2) of the reducer 13 coincide with each other; and a center of each axle 9 coincides with a center of the bogie frame 7 (see FIG. 2) in the leftward/rightward direction. The values of the allowable displacement amounts $\delta_x$, $\delta_y$, and $\delta_z$ depend on structures of the bogie 3 including the axle box suspension 17, and the like.

Figure 8A:
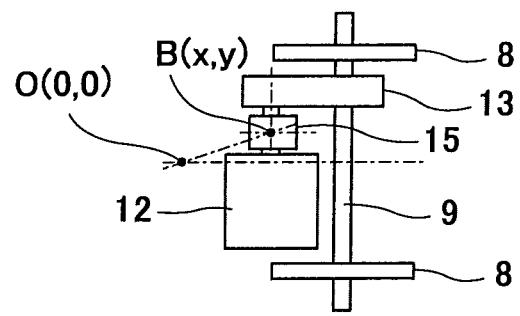
FIG. 8A is a schematic diagram showing a positional relation between the electric motor and the reducer in a non-steering state.
Figure 8B:
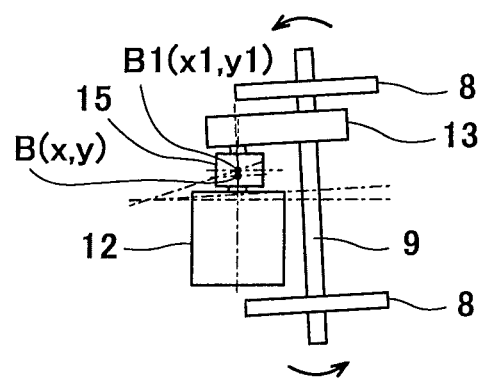
FIG. 8B is a schematic diagram showing a state where an axle is steered in one direction by a steering mechanism.
Figure 8C:
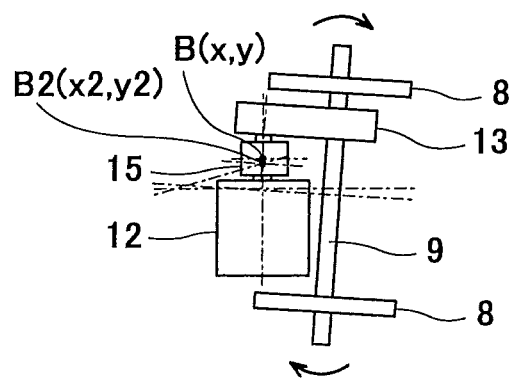
FIG. 8C is a schematic diagram showing a state where the axle is steered in the other direction by the steering mechanism.

FIG. 8A is a schematic diagram showing a positional relation between the electric motor 12 and the reducer 13 in the non-steering state. FIG. 8B is a schematic diagram showing a state where the axle 9 is steered in one direction by the steering mechanism 30. FIG. 8C is a schematic diagram showing a state where the axle 9 is steered in the other direction by the steering mechanism 30. The steering bogie 3 is provided with the steering mechanism 30 which can rotate the axle 9 in the yawing direction. Therefore, the forward/rearward direction relative displacement and the leftward/rightward direction relative displacement (FIGS. 8B and 8C) by the steering mechanism 30 may be generated between the electric motor 12 attached to the bogie frame 7 and the reducer 13 attached to the axle 9.

FIG. 8A shows the positional relation between the electric motor 12 and the reducer 13 in the non-steering state. In a planar coordinate system in which a steering center point O (0, 0) is a base point in a plan view, a center of the constant velocity ball joint 15 in the non-steering state is denoted by B (x, y). It should be noted that the non-steering state is a state where: the axles 9 are parallel to the cross beam 7a; and the front axle 9 and the rear axle 9 are parallel to each other. The center of the constant velocity ball joint 15 when the axle 9 is steered in one direction by the steering mechanism 30 (see FIG. 1) as shown in FIG. 8B is denoted by B1 ($x_1$, $y_1$), and the center of the constant velocity ball joint 15 when the axle 9 is steered in the other direction by the steering mechanism 30 (see FIG. 1) as shown in FIG. 8C is denoted by B2 ($x_2$, $y_2$). Those values $x_1$, $y_1$, $x_2$, and $y_2$ are represented by Formulas 2 and 3 below. The steering angle $\theta_s$ in Formula 2 denotes an allowable steering angle that is an upper limit of the steering angle. The value of the steering angle $\theta_s$ depends on the structures of the bogie 3 including the steering mechanism 30, a maximum curvature of the track, and the like.

$$\begin{pmatrix} x_1 \\ y_1 \end{pmatrix} = \begin{pmatrix} \cos\theta_s & -\sin\theta_s \\ \sin\theta_s & \cos\theta_s \end{pmatrix} \begin{pmatrix} x \\ y \end{pmatrix} \qquad \text{Formula 2}$$

$$\begin{pmatrix} x_2 \\ y_2 \end{pmatrix} = \begin{pmatrix} \cos(-\theta_s) & -\sin(-\theta_s) \\ \sin(-\theta_s) & \cos(-\theta_s) \end{pmatrix} \begin{pmatrix} x \\ y \end{pmatrix} \qquad \text{Formula 3}$$

The forward/rearward direction allowable displacement amount between the electric motor 12 and the reducer 13 by the steering mechanism 30 is denoted by $\delta_{sx}$, and the leftward/rightward direction allowable displacement amount between the electric motor 12 and the reducer 13 by the steering mechanism 30 is denoted by $\delta_{sy}$. The allowable displacement amounts $\delta_{sx}$ and $\delta_{sy}$ are represented by Formulas 4 and 5 below.

$$\delta_{sx} = \text{Max}\{|x_1-x|, |x_2-x|\} \qquad \text{Formula 4}$$

$$\delta_{sy} = \text{Max}\{|y_1-y|, |y_2-y|\} \qquad \text{Formula 5}$$

According to the above configuration, in the steering bogie 3 of the present embodiment, an allowable deviation amount $\delta_r$ of the constant velocity ball joint 15 in a direction perpendicular to the axial direction of the output shaft 28 (see FIG. 2) of the electric motor 12 is set so as to satisfy Formula 6 below.

$$\delta_r = \sqrt{\delta_z^2 + (\delta_x + \delta_{sx})^2} \qquad \text{Formula 6}$$

In the steering bogie 3 of the present embodiment, an allowable deviation amount $\delta_a$ of the constant velocity ball joint 15 in the axial direction of the output shaft 28 of the electric motor 12 is set so as to satisfy Formula 7.

$$\delta_a = \delta_y + \delta_{sy} \qquad \text{Formula 7}$$

Specifically, the allowable deviation amount $\delta_r$ of the constant velocity ball joint 15 in the direction perpendicular to the axial direction of the output shaft 28 of the electric motor 12 is set to a value which is not less than 17 mm and not more than 20 mm, and the allowable deviation amount $\delta_a$ of the constant velocity ball joint 15 in the axial direction of the output shaft 28 of the electric motor 12 is set to a value which is not less than 15 mm and not more than 17 mm.

According to the configuration explained above, the constant velocity ball joint 15 is used as a joint between the output shaft 28 of the electric motor 12 and the input shaft 29 of the reducer 13. Therefore, the backlash is unnecessary unlike the conventional WN gear coupling, and large deviation is allowable by spherical guide of the balls 34. On this account, even if the relative displacement of the axle 9 in the yawing direction relative to the electric motor 12 supported by the bogie frame 7 occurs when the bogie 3 passes through the curved line and the axle 9 is steered, the constant velocity ball joint 15 can follow the displacement. Since the constant velocity ball joint 15 can follow the steering of the axle 9, both the front axle 9 and the rear axle 9 can be configured as the driving shafts which can be steered. As a result, it is possible to provide the parallel cardan driving system steering bogie 3 capable of suppressing the change in the steering function by the running direction and the increase in the cost of the railcar 1.

Extending directions of the groove portions 36a and 37a of the outer tubes 36 and 37 of the constant velocity ball joint 15 and extending directions of the groove portions 31b and 32b of the inner tubes 31 and 32 of the constant velocity ball joint 15 do not intersect with each other but are the same as each other. Therefore, when the balls 34 and 35 guide the groove portion 31b, 32b, 36a, and 37a to deviate the joint 15, structural resistance between the ball (34 or 35) and the groove portion (31b, 32b, 36a, or 37a) is reduced. Even when the bogie 3 passes through the sharp curved line, the constant velocity ball joint 15 largely deviates, and therefore, the steering is smoothly performed.

The allowable deviation amounts $\delta_r$ and $\delta_a$ of the constant velocity ball joint 15 are set so as to satisfy Formulas 6 and 7, respectively, and each of the allowable deviation amounts $\delta_r$ and $\delta_a$ is larger than the allowable displacement amount between the electric motor 12 and the reducer 13 by the axle box suspension 17 and the steering mechanism 30. Therefore, the parallel cardan driving system driving bogie which can perform stable steering running can be realized. More specifically, the allowable deviation amount $\delta_r$ of the constant velocity ball joint 15 in the direction perpendicular to the axial direction of the output shaft 28 is set to a value which is not less than 17 mm and not more than 20 mm, and the allowable deviation amount $\delta_a$ of the constant velocity ball joint 15 in the axial direction of the output shaft 28 is set to be a value which is not less than 15 mm and not more than 17 mm. Therefore, the constant velocity ball joint 15 allows the deviation which is about 1.5 times the deviation allowed by the conventional WN gear coupling. Thus, the parallel cardan driving system driving bogie which can perform stable steering running can be realized.

Further, the steering mechanism 30 is configured to steer the axle 9 such that in a plan view, the axle 9 can intersect with the virtual extended line VL extending in the car width direction from the surface 27aa of the intermediate portion 27a of the casing 27 of the electric motor 12, the surface 27aa being close to the axle 9. Therefore, while preventing the interference between the axle 9 and the electric motor 12 by the steering, devices mounted on the bogie 3 can be efficiently arranged.

The present invention is not limited to the above-described embodiment, and modifications, additions, and eliminations may be made within the scope of the present invention.

INDUSTRIAL APPLICABILITY

As above, the parallel cardan driving system steering bogie according to the present invention has the above-described excellent effects. It is useful to widely apply the present invention to railcar bogies which can achieve the significance of these effects.

REFERENCE SIGNS LIST 1 railcar
2 carbody
3 steering bogie
7 bogie frame
9 axle
12 electric motor
13 reducer
15 constant velocity ball joint
17 axle box suspension (suspension)
27 casing
27a intermediate portion
27b outside portion
28 output shaft
30 steering mechanism
31, 32 inner tube
34, 35 ball
36, 37 outer tube
38, 39 retainer
31b, 32b, 36a, 37a groove portion
VL virtual extended line

The invention claimed is:
1. A parallel cardan driving system steering bogie for a railcar, the parallel cardan driving system steering bogie comprising:
a bogie frame supporting a carbody of a railcar;
first and second axles arranged at front and rear sides in a car longitudinal direction, respectively, and extending along a car width direction;
a steering mechanism configured to rotate both the first and second axles relative to the bogie frame to perform steering;
first and second electric motors supported by the bogie frame, arranged at the front and rear sides in the car longitudinal direction, respectively, and including first and second output shafts, respectively, the first and second output shafts being parallel to the first and second axles at the time of non-steering;
first and second reducers connected to the first and second axles, respectively;
a first constant velocity ball joint, the first output shaft being coupled to the first reducer by the first constant velocity ball joint, and the first constant velocity ball joint following rotations of the first axle at the time of steering to allow relative displacement between the first output shaft and the first reducer;
a second constant velocity ball joint, the second output shaft being coupled to the second reducer by the second constant velocity ball joint, and the second constant velocity ball joint following rotations of the second axle at the time of the steering to allow relative displacement between the second output shaft and the second reducer; and
suspensions by which the first and second axles are connected to the bogie frame, wherein:
when each of a vertical direction allowable displacement amount between the first reducer and the first electric motor by the suspension and a vertical direction allowable displacement amount between the second reducer and the second electric motor by the suspension is denoted by $\delta_z$, each of a car longitudinal direction allowable displacement amount between the first reducer and the first electric motor by the suspension and a car longitudinal direction allowable displacement amount between the second reducer and the second electric motor by the suspension is denoted by $\delta_x$, each of a car width direction allowable displacement amount between the first reducer and the first electric motor by the suspension and a car width direction allowable displacement amount between the second reducer and the second electric motor by the suspension is denoted by $\delta_y$, each of a car longitudinal direction allowable displacement amount between the first reducer and the first electric motor by the steering mechanism and a car longitudinal direction allowable displacement amount between the second reducer and the second electric motor by the steering mechanism is denoted by $\delta_{sx}$, and each of a car width direction allowable displacement amount between the first reducer and the first electric motor by the steering mechanism and a car width direction allowable displacement amount between the second reducer and the second electric motor by the steering mechanism is denoted by $\delta_{sy}$,
an allowable deviation amount $\delta_r$ of each of the first constant velocity ball joint in a direction perpendicular to an axial direction of the first output shaft and the second constant velocity ball joint in a direction perpendicular to an axial direction of the second output shaft is represented by $\delta_r > (\delta_z^2 + (\delta_x + \delta_{sx})^2)^{1/2}$, and
an allowable deviation amount $\delta_r$ of each of the first constant velocity ball joint in the axial direction of the first output shaft and the second constant velocity ball joint in the axial direction of the second output shaft is represented by $\delta_a > \delta_y + \delta_{sy}$.

2. A parallel cardan driving system steering bogie for a railcar, the parallel cardan driving system steering bogie comprising:
    a bogie frame supporting a carbody of a railcar;
    first and second axles arranged at front and rear sides in a car longitudinal direction, respectively, and extending along a car width direction;
    a steering mechanism configured to rotate both the first and second axles relative to the bogie frame to perform steering;
    first and second electric motors supported by the bogie frame, arranged at the front and rear sides in the car longitudinal direction, respectively, and including first and second output shafts, respectively, the first and second output shafts being parallel to the first and second axles at the time of non-steering;
    first and second reducers connected to the first and second axles, respectively;
    a first constant velocity ball joint, the first output shaft being coupled to the first reducer by the first constant velocity ball joint, and the first constant velocity ball joint following rotations of the first axle at the time of steering to allow relative displacement between the first output shaft and the first reducer, and
    a second constant velocity ball joint, the second output shaft being coupled to the second reducer by the second constant velocity ball joint, and the second constant velocity ball joint following rotations of the second axle at the time of the steering to allow relative displacement between the second output shaft and the second reducer,
    wherein:
    an allowable deviation amount $\delta_r$ of each of the first constant velocity ball joint in the direction perpendicular to the axial direction of the first output shaft and the second constant velocity ball joint in the direction perpendicular to the axial direction of the second output shaft is set to a value which is not less than 17 mm and not more than 20 mm; and
    an allowable deviation amount $\delta_a$ of each of the first constant velocity ball joint in the axial direction of the first output shaft and the second constant velocity ball joint in the axial direction of the second output shaft is set to a value which is not less than 15 mm and not more than 17 mm.

3. A parallel cardan driving system steering bogie for a railcar, the parallel cardan driving system steering bogie comprising:
    a bogie frame supporting a carbody of a railcar;
    first and second axles arranged at front and rear sides in a car longitudinal direction, respectively, and extending along a car width direction;
    a steering mechanism configured to rotate both the first and second axles relative to the bogie frame to perform steering;
    first and second electric motors supported by the bogie frame, arranged at the front and rear sides in the car longitudinal direction, respectively, and including first and second output shafts, respectively, the first and second output shafts being parallel to the first and second axles at the time of non-steering;
    first and second reducers connected to the first and second axles, respectively;
    a first constant velocity ball joint, the first output shaft being coupled to the first reducer by the first constant velocity ball joint, and the first constant velocity ball joint following rotations of the first axle at the time of steering to allow relative displacement between the first output shaft and the first reducer, and
    a second constant velocity ball joint, the second output shaft being coupled to the second reducer by the second constant velocity ball joint, and the second constant velocity ball joint following rotations of the second axle at the time of the steering to allow relative displacement between the second output shaft and the second reducer,
    wherein:
    the first and second electric motors include respective casings;
    each of the casings includes
        an intermediate portion located at a car width direction intermediate region,
        an outside portion located at a car width direction outside region relative to the intermediate portion, and
        an inside portion located at a car width direction inside region relative to the intermediate portion;
    surfaces of the outside portion and the inside portion are provided further away from the axle than a surface of the intermediate portion, the surfaces of the outside portion, the inside portion, and the intermediate portion being close to the axle;
    the surfaces of the outside portion and the inside portion are symmetrically inclined such that distances from the surfaces to the axle in the car longitudinal direction increase toward an outer side and an inner side, respectively, in the car width direction; and
    the steering mechanism steers the axle such that in a plan view, the axle intersects with a virtual extended line in a state where a gap is secured between the axle and the surface of the outside portion, the surface of the outside portion being close to the axle, the virtual extended line extending in the car width direction from the surface of the intermediate portion, the surface of the intermediate portion being close to the axle.

* * * * *